US012679774B2

(12) United States Patent
Lee et al.

(10) Patent No.: US 12,679,774 B2
(45) Date of Patent: Jul. 14, 2026

(54) METHOD FOR MANUFACTURING SILICON NITRIDE SUBSTRATE

(71) Applicant: OCI Company Ltd., Seoul (KR)

(72) Inventors: Seung Yeon Lee, Gyeonggi-do (KR); Seunggwan Lee, Gyeonggi-do (KR); Eun Ok Chi, Gyeonggi-do (KR)

(73) Assignee: OCI Company Ltd., Seoul (KR)

( * ) Notice: Subject to any disclaimer, the term of this patent is extended or adjusted under 35 U.S.C. 154(b) by 1106 days.

(21) Appl. No.: 17/761,783

(22) PCT Filed: Sep. 18, 2020

(86) PCT No.: PCT/KR2020/012666
§ 371 (c)(1),
(2) Date: Mar. 18, 2022

(87) PCT Pub. No.: WO2021/054788
PCT Pub. Date: Mar. 25, 2021

(65) Prior Publication Data
US 2022/0371963 A1 Nov. 24, 2022

(30) Foreign Application Priority Data

Sep. 20, 2019 (KR) ........................ 10-2019-0116131

(51) Int. Cl.
*C04B 35/00* (2006.01)
*C04B 35/593* (2006.01)
(Continued)

(52) U.S. Cl.
CPC ...... *C04B 35/5935* (2013.01); *C04B 35/6261* (2013.01); *C04B 35/62685* (2013.01);
(Continued)

(58) Field of Classification Search
CPC ......... B22F 3/15; B28B 7/0097; B30B 15/06; B01J 2219/2459; C04B 2237/368
See application file for complete search history.

(56) References Cited

U.S. PATENT DOCUMENTS 3,703,278 A * 11/1972 Isaksson ............... B30B 11/002
266/250
3,935,358 A * 1/1976 Wyeth ..................... B32B 27/32
428/167
(Continued)

FOREIGN PATENT DOCUMENTS

CN 100398491 C * 7/2008
CN 202716133 U 2/2013
(Continued)

OTHER PUBLICATIONS

CN-100398491-C (Zhang) Jul. 2008 (online machine translation), [Retrieved on Apr. 30, 2025]. Retrieved from: Espacenet (Year: 2008).*
(Continued)

*Primary Examiner* — JaMel M Nelson
*Assistant Examiner* — Andrés E. Behrens, Jr.
(74) *Attorney, Agent, or Firm* — HoustonHogle LLP

(57) ABSTRACT

The present invention relates to a method for manufacturing a silicon nitride substrate and, more specifically, comprises the steps of: forming a slurry by mixing silicon nitride powder, a ceramic additive, and a solvent; molding the slurry to form sheets; sandwiching at least one of the sheets between a lower plate and an upper plate to form a stacked structure; degreasing the stacked structure; and sintering the stacked structure. At least one of the lower plate and the upper plate comprises a plurality of protrusions provided on one surface thereof, and the protrusions extend in parallel to each other in one direction.

10 Claims, 8 Drawing Sheets

(51) Int. Cl.

| | | |
|---|---|---|
| *C04B 35/626* | (2006.01) | |
| *C04B 35/636* | (2006.01) | |
| *C04B 41/00* | (2006.01) | |
| *C04B 41/45* | (2006.01) | |
| *B32B 3/00* | (2006.01) | |
| *B32B 3/30* | (2006.01) | |
| *B32B 5/00* | (2006.01) | |
| *B32B 5/30* | (2006.01) | |
| *B32B 9/00* | (2006.01) | |
| *B32B 9/04* | (2006.01) | |
| *B32B 18/00* | (2006.01) | |
| *C04B 35/584* | (2006.01) | |
| *C04B 35/622* | (2006.01) | |
| *C04B 103/00* | (2006.01) | |
| *C04B 103/30* | (2006.01) | |

(52) U.S. Cl.

CPC ...... *C04B 35/6365* (2013.01); *C04B 41/4501* (2013.01); *B32B 3/00* (2013.01); *B32B 3/30* (2013.01); *B32B 5/00* (2013.01); *B32B 5/30* (2013.01); *B32B 9/00* (2013.01); *B32B 9/04* (2013.01); *B32B 18/00* (2013.01); *C04B 35/00* (2013.01); *C04B 35/584* (2013.01); *C04B 35/622* (2013.01); *C04B 41/00* (2013.01); *C04B 2103/00* (2013.01); *C04B 2103/30* (2013.01); *C04B 2235/3206* (2013.01); *C04B 2235/3225* (2013.01); *C04B 2235/3244* (2013.01); *C04B 2235/3873* (2013.01); *C04B 2235/945* (2013.01); *C04B 2237/368* (2013.01)

(56) References Cited

U.S. PATENT DOCUMENTS

| | | | | |
|---|---|---|---|---|
| 4,560,669 | A * | 12/1985 | Matsuhiro | C04B 35/584 |
| | | | | 501/97.3 |
| 5,236,687 | A * | 8/1993 | Fukuda | C04B 38/00 |
| | | | | 423/447.2 |
| 5,506,046 | A * | 4/1996 | Andersen | B29C 49/0412 |
| | | | | 524/498 |
| 6,514,066 | B1 * | 2/2003 | Bergman | B30B 11/002 |
| | | | | 219/400 |
| 6,893,762 | B2 * | 5/2005 | Sarkar | H01M 8/0252 |
| | | | | 264/618 |
| 7,513,932 | B2 | 4/2009 | Carolan et al. | |
| 7,948,075 | B2 | 5/2011 | Kaga et al. | |
| 9,085,462 | B2 | 7/2015 | Shibata et al. | |
| 2002/0190431 | A1 * | 12/2002 | Matsumoto | B29D 11/00663 |
| | | | | 425/408 |
| 2003/0232221 | A1 * | 12/2003 | Yamada | C04B 35/44 |
| | | | | 428/697 |
| 2004/0186018 | A1 * | 9/2004 | Carolan | B32B 18/00 |
| | | | | 210/500.25 |
| 2004/0197633 | A1 * | 10/2004 | Yamamoto | H01M 8/0226 |
| | | | | 429/434 |
| 2005/0206050 | A1 * | 9/2005 | Yoshioka | C04B 35/64 |
| | | | | 264/667 |
| 2007/0128464 | A1 * | 6/2007 | Jang | B32B 27/281 |
| | | | | 428/688 |
| 2008/0203612 | A1 * | 8/2008 | Thompson | B29C 33/56 |
| | | | | 425/106 |
| 2009/0035538 | A1 * | 2/2009 | Namerikawa | C04B 35/6346 |
| | | | | 264/299 |

| | | | | |
|---|---|---|---|---|
| 2009/0224399 | A1 * | 9/2009 | Kaga | H01L 23/15 |
| | | | | 428/210 |
| 2012/0250212 | A1 * | 10/2012 | Kimura | C04B 35/63488 |
| | | | | 156/89.12 |
| 2014/0220302 | A1 * | 8/2014 | Kaga | C04B 35/64 |
| | | | | 428/149 |
| 2016/0280604 | A1 * | 9/2016 | Nobori | C04B 35/62685 |
| 2018/0002237 | A1 * | 1/2018 | Aoki | C04B 35/584 |
| 2020/0406499 | A1 * | 12/2020 | Nobori | B28B 11/243 |
| 2021/0269368 | A1 * | 9/2021 | Cho | C04B 37/026 |
| 2025/0382233 | A1 * | 12/2025 | Eo | C04B 35/584 |

FOREIGN PATENT DOCUMENTS

| | | | | | |
|---|---|---|---|---|---|
| CN | 204596618 | U | | 8/2015 | |
| CN | 205300269 | U | | 6/2016 | |
| CN | 106588090 | | | 4/2017 | |
| CN | 206192127 | U | | 5/2017 | |
| CN | 107522495 | | | 12/2017 | |
| CN | 107857595 | | | 3/2018 | |
| CN | 109133904 | | | 1/2019 | |
| JP | 2004319127 | A | * | 11/2004 | |
| JP | 2006029611 | A | | 2/2006 | |
| JP | 2009218322 | A | | 9/2009 | |
| JP | 2010076948 | A | * | 4/2010 | |
| JP | 2011178598 | A | * | 9/2011 | |
| JP | 2013178053 | A | | 9/2013 | |
| JP | 2016038194 | A | | 3/2016 | |
| JP | 2017-061146 | A | | 3/2017 | |
| KR | 10-2004-0083377 | A | | 10/2004 | |
| KR | 10-2009-0097118 | A | | 9/2009 | |
| KR | 10-2010-0020715 | A | | 2/2010 | |
| KR | 10-2014-0136002 | A | | 11/2014 | |
| KR | 10-2017-0135105 | A | | 12/2017 | |
| KR | 20170135105 | A | * | 12/2017 | |
| KR | 20190032966 | A | | 3/2019 | |
| WO | WO-2016094863 | A1 | * | 6/2016 | C04B 35/597 |

OTHER PUBLICATIONS

JP-2011178598-A (Kaga) Sep. 2011 (online machine translation), [Retrieved on Apr. 30, 2025]. Retrieved from: Espacenet (Year: 2011).* https://www.cfccarbon.com/news/properties-of-graphite-density-and-mechanical-properties.html CFCC, Oct. 19, 2017 (Year: 2017).*

JP-2004319127-A (Hiroshi) Nov. 2004 (online machine translation), [Retrieved on Apr. 30, 2025]. Retrieved from: Espacenet (Year: 2004).*

KR 20170135105 A (Soo) Dec. 2017 (online machine translation), [Retrieved on Apr. 30, 2025]. Retrieved from: Espacenet (Year: 2017).*

JP-2010076948-A (Hiroyuki ) Apr. 2010 (online machine translation), [Retrieved on Apr. 30, 2025]. Retrieved from: Espacenet (Year: 2010).* https://rsrefractoryfirebrick.com/alumina-bubble-bricks/ Refractory Fire Bricks (Alumina Bubble Bricks, 2017, (Year: 2017).*

International Search Report of the International Searching Authority, mailed on Dec. 23, 2020, from International Application No. PCT/KR2020/012666, filed on Sep. 18, 2020. 6 pages.

Written Opinion mailed on Dec. 23, 2020, from International Application No. PCT/KR2020/012666, filed on Sep. 18, 2020. 4 pages.

International Preliminary Report on Patentability, mailed on Mar. 15, 2022, from International Application No. PCT/KR2020/012666, filed on Sep. 18, 2020. 9 pages.

* cited by examiner

METHOD FOR MANUFACTURING SILICON NITRIDE SUBSTRATE

RELATED APPLICATIONS

This application is a § 371 National Phase Application of International Application No. PCT/KR2020/012666, filed on Sep. 18, 2020, now International Publication No. WO 2021/054788 A1, published on Mar. 25, 2021, which International Application claims priority to Korean Patent Application No. 10-2019-0116131, filed on Sep. 20, 2019, both of which are incorporated herein by reference in their entirety.

TECHNICAL FIELD

The present invention relates to a method for manufacturing a silicon nitride substrate.

BACKGROUND ART

A ceramic material having high electrical insulation and thermal conductivity may be used as a heating medium that quickly transfers heat generated from a device. The ceramic material is used for a substrate of a device for transport machines, a substrate for highly integrated electronic circuits, a heat dissipation component for laser oscillation parts, a reaction container component for semiconductor manufacturing apparatuses, and a precision machine component.

Particularly, a ceramic substrate used for high output power devices is required to have high insulation, high voltage resistance, high thermal conductivity, high strength, and a low dielectric constant. The ceramic substrate suitable for the above-described needs includes an aluminum nitride substrate, an alumina substrate, and a silicon nitride substrate.

The silicon nitride ($Si_3N_4$) substrate has high strength (500 MPa to 800 MPa), high ductility (5 MPa·m to 8 MPa·m), and excellent consistency of a thermal expansion coefficient with silicon (Si). Furthermore, the silicon nitride ($Si_3N_4$) substrate has high thermal conductivity (70 W/mK to 170 W/mK). That is, the silicon nitride ($Si_3N_4$) substrate is suitable for a material of a next generation high output power device.

DISCLOSURE OF THE INVENTION

Technical Problem

The present invention provides a method for manufacturing a high quality silicon nitride substrate.

Technical Solution

According to the concept of the present invention, a method for manufacturing a silicon nitride substrate includes: forming a slurry by mixing silicon nitride powder, a ceramic additive, and a solvent; molding the slurry to form sheets; sandwiching at least one of the sheets between a lower plate and an upper plate to form a stacked structure; degreasing the stacked structure; and sintering the stacked structure. Here, at least one of the lower plate and the upper plate includes a plurality of protrusions provided on one surface thereof, and the protrusions extend in parallel to each other in one direction.

Advantageous Effects

The method for manufacturing the silicon nitride substrate may sandwich the silicon nitride sheet by using the lower plate and the upper plate, each of which has the patterned surface. As the degreasing process and the sintering process are performed on the stacked structure formed as described above, the degreasing process and the sintering process may be further effectively performed. As a result, the present invention can provide the high quality silicon nitride substrate.

MODE FOR CARRYING OUT THE INVENTION

Hereinafter, embodiments of the present invention will be described with reference to the accompanying drawings so as to sufficiently understand constitutions and effects of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Also, though terms like a first, a second, and a third are used to describe various regions and layers in various embodiments of the inventive concept, the regions and the layers are not limited to these terms. These terms are only used to distinguish one component from another component. An embodiment described and exemplified herein includes a complementary embodiment thereof.

In the following description, the technical terms are used only for explaining a specific exemplary embodiment while not limiting the present invention. In the specification, the terms of a singular form may include plural forms unless referred to the contrary. Also, the meaning of "include," "comprise," "including," or "comprising," specifies a property, a region, a fixed number, a step, a process, an element and/or a component but does not exclude other properties, regions, fixed numbers, steps, processes, elements and/or components.

Figure 1:
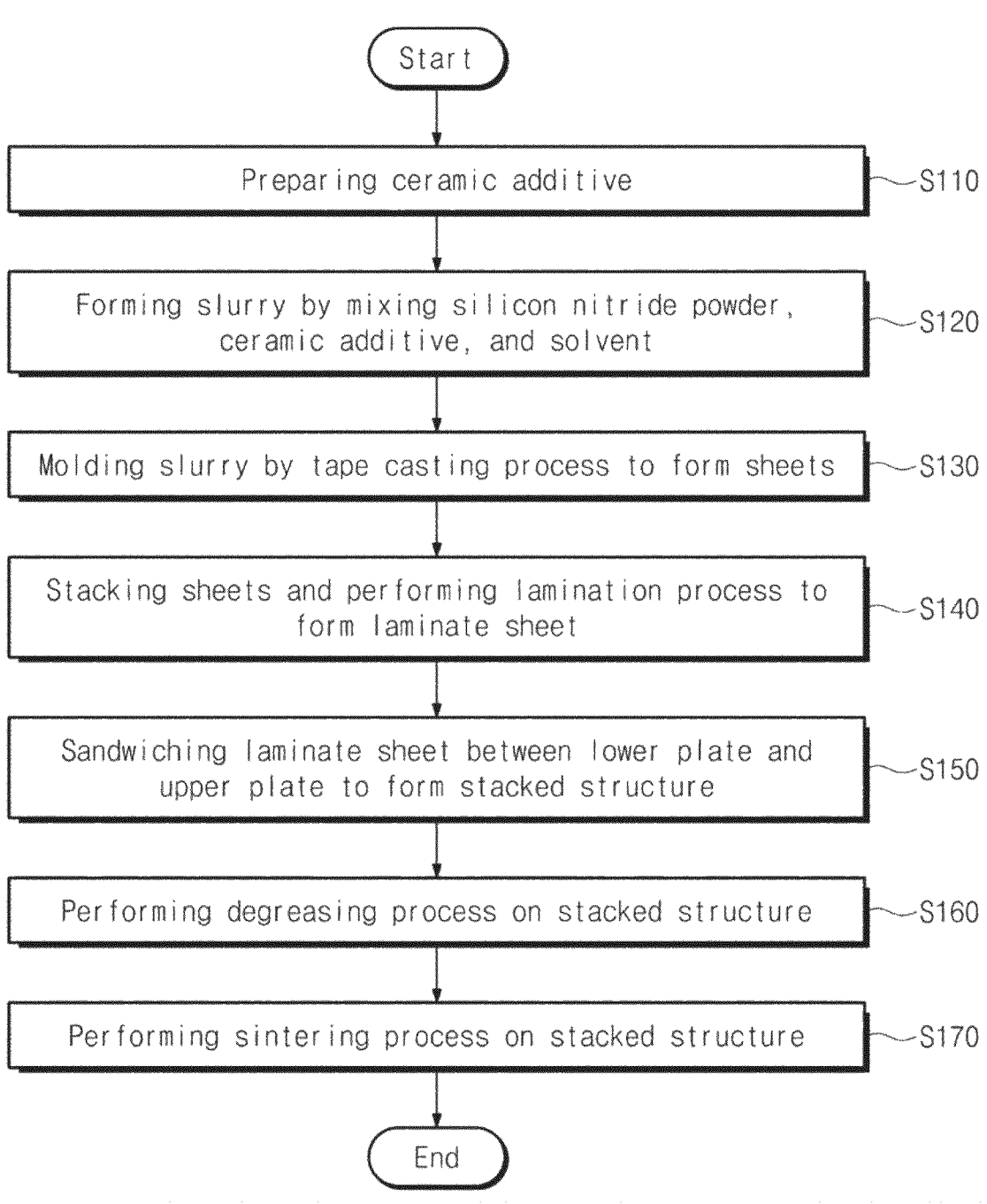
FIG. 1 is a flowchart for explaining a method for manufacturing a silicon nitride substrate according to embodiments of the present invention.

FIG. 1 is a flowchart for explaining a method for manufacturing a silicon nitride substrate according to embodiments of the present invention.

Referring to FIG. 1, the method for manufacturing the silicon nitride substrate according to embodiments of the present invention may include: a first step S110 of preparing a ceramic additive; a second step S120 of forming a slurry by mixing silicon nitride powder, the ceramic additive, and a solvent; a third step S130 of molding the slurry by a tape casting process to form sheets; a fourth step S140 of stacking the sheets and performing a lamination process thereon to form a laminate sheet; a fifth step S150 of sandwiching the laminate sheet between a lower plate and an upper plate to form a stacked structure; a sixth step S160 of performing a degreasing process on the stacked structure; and a seventh step S170 of performing a sintering process on the stacked structure.

Figure 2:
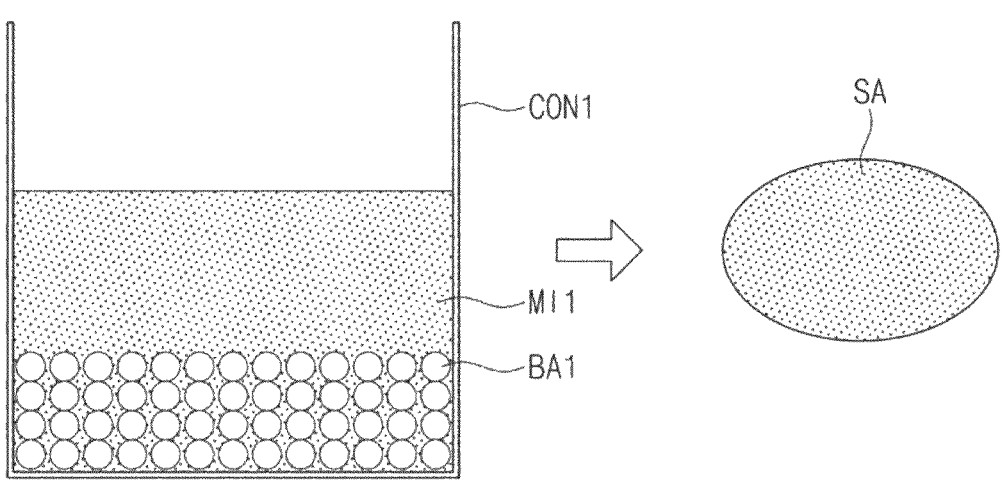
FIG. 2 is a schematic view for explaining a first step of FIG. 1.

FIG. 2 is a schematic view for explaining the first step of FIG. 1.

Referring to FIGS. 1 and 2, first balls BA1 and a first mixture MI1 may be provided in a first container CON1. The first mixture MI1 may include ceramic powder and a solvent. Specifically, the first balls BA1 and the solvent may be put into the first container CON1. The ceramic power may be put into the solvent. The first balls BA1 may include ceramic such as zirconia. The solvent may be an organic solvent, e.g., ethanol. The ceramic powder may include an yttrium oxide ($Y_2O_3$), a magnesium oxide (MgO), and a zirconium oxide ($ZrO_2$). According to another embodiment of the present invention, the zirconium oxide ($ZrO_2$) in the ceramic powder may be omitted.

The ceramic powder may be uniformly mixed in the first mixture MI1 by mixing the first mixture MI1 using a mixer. The first balls BA1 may physically assist the ceramic powder to be uniformly mixed. Specifically, the yttrium oxide, the magnesium oxide, and the zirconium oxide may be uniformly mixed in the first mixture MI1.

After the mixing is completed, the first balls BA1 may be removed. The entire solvent may be evaporated by drying the first mixture MI1. As a result, the ceramic additive SA in the form of powder may be obtained in the step S110. The ceramic additive SA may include the yttrium oxide ($Y_2O_3$), the magnesium oxide (MgO), and the zirconium oxide ($ZrO_2$). According to another embodiment of the present invention, the zirconium oxide ($ZrO_2$) in the ceramic additive SA may be omitted.

A weight ratio of the yttrium oxide to the ceramic additive SA may be 0.5 to 0.8. A weight ratio of the magnesium oxide to the ceramic additive SA may be 0.1 to 0.4. A weight ratio of the zirconium oxide to the ceramic additive SA may be 0 to 0.3 (i.e., equal to or less than 0.3). When the ceramic additive SA does not contain the zirconium oxide, the weight ratio of the zirconium oxide may be 0. According to an embodiment of the present invention, the weight ratio of the zirconium oxide to the ceramic additive SA may be 0.1 to 0.3.

For example, the yttrium oxide may have a weight ratio of about 56 wt %, the magnesium oxide may have a weight ratio of about 22 wt %, and the zirconium oxide may have a weight ratio of about 22 wt % in the ceramic additive SA.

FIGS. 3a to 3e are schematic views for explaining the second step of FIG. 1.

Figure 3A:
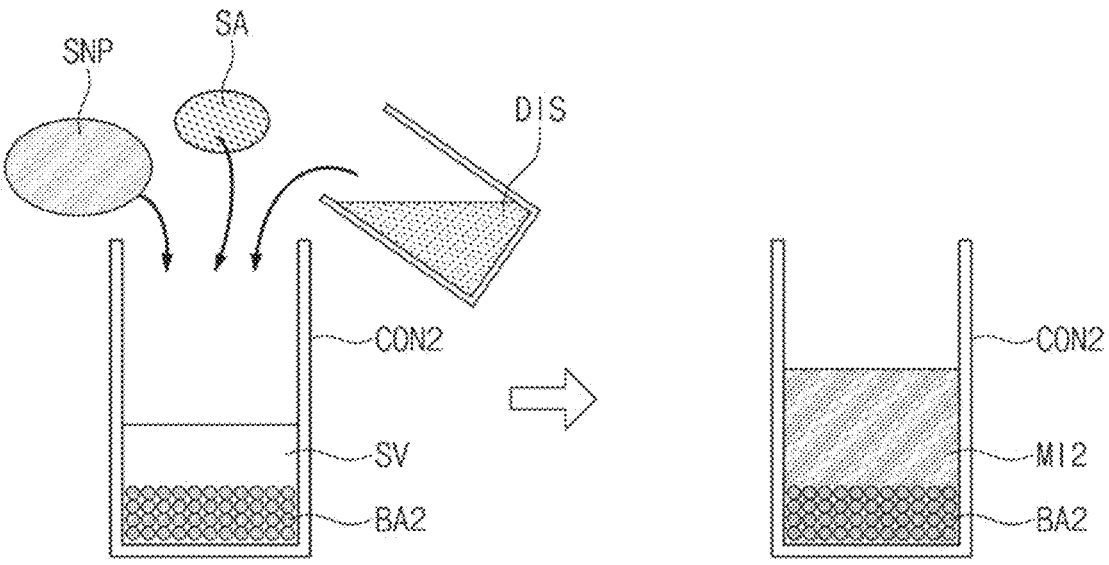
FIGS. 3a to 3e are schematic views for explaining a second step of FIG. 1.

Referring to FIGS. 1 and 3a, second balls BA2 and a solvent SV may be provided in a second container CON2. The solvent SV may be an organic solvent, e.g., isopropyl alcohol and toluene. The isopropyl alcohol and the toluene may be mixed with a volume ratio of 4:6. The second balls BA2 may include a silicon nitride.

A second mixture MI2 may be prepared by putting silicon nitride ($Si_3N_4$) powder SNP, the ceramic additive SA, and a dispersant DIS into the solvent SV in the second container CON2. The ceramic additive SA may be prepared through the previous first step S110. The dispersant DIS may include a commercially available dispersant DIS, e.g., BYK-111.

The solvent SV may have a volume ratio of 40 vol % to 60 vol % to an entire volume of the second mixture MI2. The silicon nitride powder SNP may have a volume ratio of 15 vol % to 25 vol % to the entire volume of the second mixture MI2. The ceramic additive SA may have a weight ratio of 5 wt % to 10 wt % to a weight of the second mixture MI2.

Figure 3B:
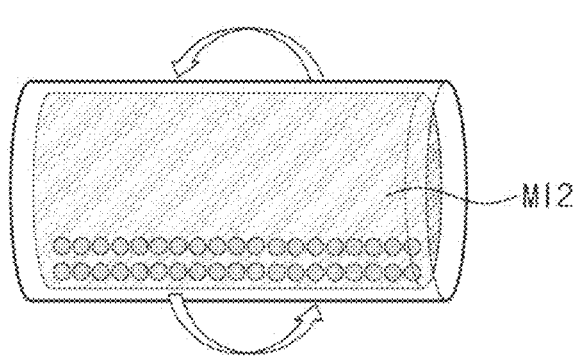

Referring to FIGS. 1 and 3b, the second mixture MI2 may be uniformly mixed by performing a first ball milling process on the second mixture MI2. The second balls BA2 may physically assist the second mixture MI2 to be uniformly mixed.

Specifically, the first ball milling process may include a process of rotating the second container CON2 in which the second mixture MI2 is stored at a predetermined speed by using a ball milling machine. As the second container CON2 is rotated, mechanical grinding and uniform mixing may be performed by the second balls BA2 in the second container CON2. The ball milling machine may have a rotation speed of 100 rpm to 500 rpm.

Figure 3C:
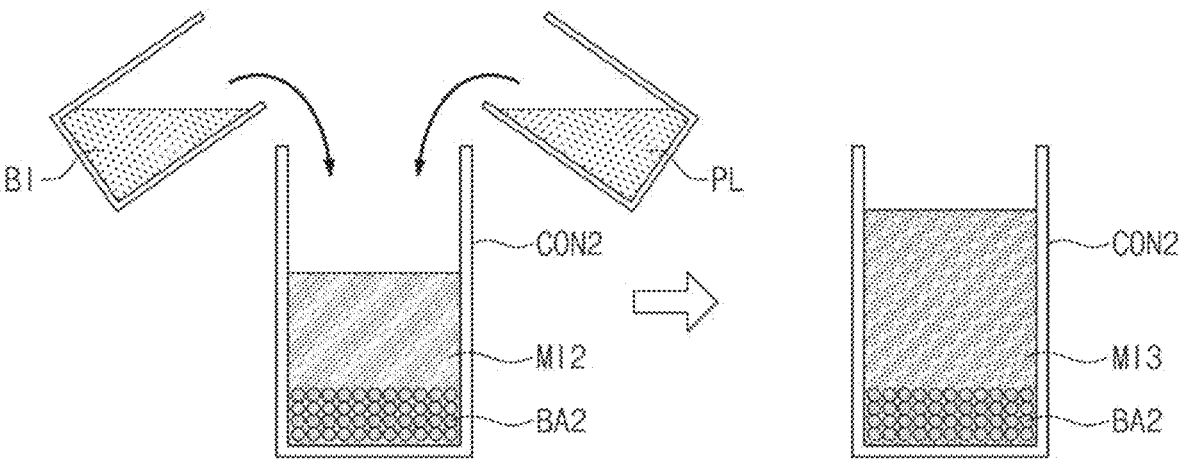

Referring to FIGS. 1 and 3c, after the first ball milling process, a third mixture MI3 may be prepared by adding a binder BI and a plasticizer PL. The binder BI may include at least one of a cellulose derivative such as ethyl cellulose, methyl cellulose, nitro cellulose, and carboxy cellulose, a resin such as polyvinyl alcohol, acrylic acid ester, methacrylic acid ester, polyvinyl butyral, and a mixture of the derivative and the resin. For example, the binder BI may include polyvinyl butyral (PVB). The plasticizer PL may include dibutyl phthalate or deoctyl phthalate. The added plasticizer PL may have a weight of about 50% of a weight of the binder BI. Additionally, a solvent may be further added to the second mixture MI2.

Figure 3D:
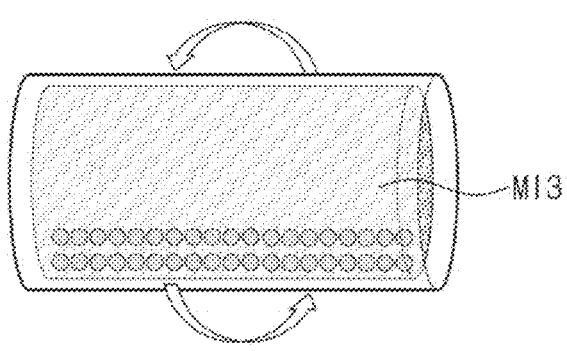

Referring to FIGS. 1 and 3d, the third mixture MI3 may be uniformly mixed by performing a second ball milling process on the third mixture MI3. As the third mixture MI3 is uniformly mixed through the second ball milling process, a slurry SL may be formed in the step S120. The second ball milling process may be substantially the same as or similar to the above-described first ball milling process. Thereafter, the second balls BA2 may be removed.

Figure 3E:
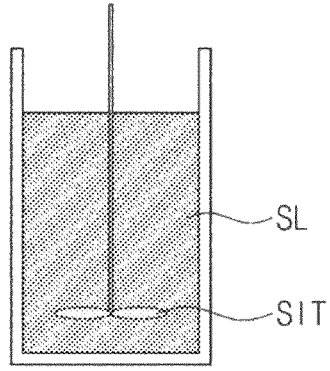

Referring to FIGS. 1 and 3e, a volatile gas may be removed from the slurry SL by aging the slurry SL formed through the second ball milling process. While the slurry SL is aged, the slurry SL may be stirred by using a stirrer SIT. The aging may be performed during about 24 hours.

Figure 4:
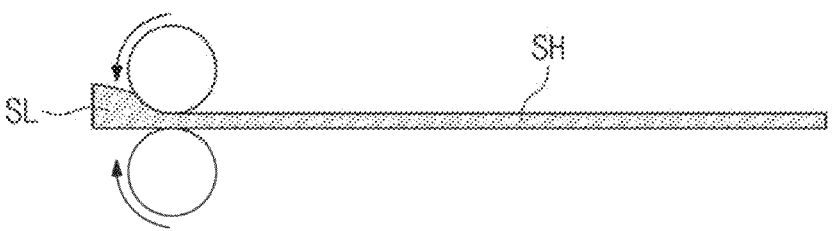
FIG. 4 is a schematic view for explaining a third step of FIG. 1.

FIG. 4 is a schematic view for explaining the third step of FIG. 1.

Referring to FIGS. 1 and 4, a sheet SH may be formed by molding the slurry SL prepared in the second step 120 in a tape casting process. Specifically, the tape casting process may include pouring the slurry SL to a blade that is set as a predetermined dam height, and applying the slurry SL on a moving substrate film. As the solvent is volatilized from the slurry SL applied on the substrate film, and the substrate film is peeled, the molded sheet SH may be obtained. A stainless steel tape, an oilpaper tape, or a polymer tape such as polyester may be used as the substrate film. For example, the slurry may be poured to a doctor blade that is set at a dam height of about 0.3 mm, and the slurry may be applied on the substrate film moving at a predetermined speed (e.g., 0.1 m/min to 1 m/min). Thereafter, as a drying process and a process of peeling the substrate film are performed, the sheet SH may be obtained.

The tape casting process may be performed at a temperature of 30° C. to 80° C. The sheet SH formed through the tape casting process may be cut into an appropriate size. The sheet SH may have a thickness of 0.1 mm to 0.16 mm.

Figure 5:
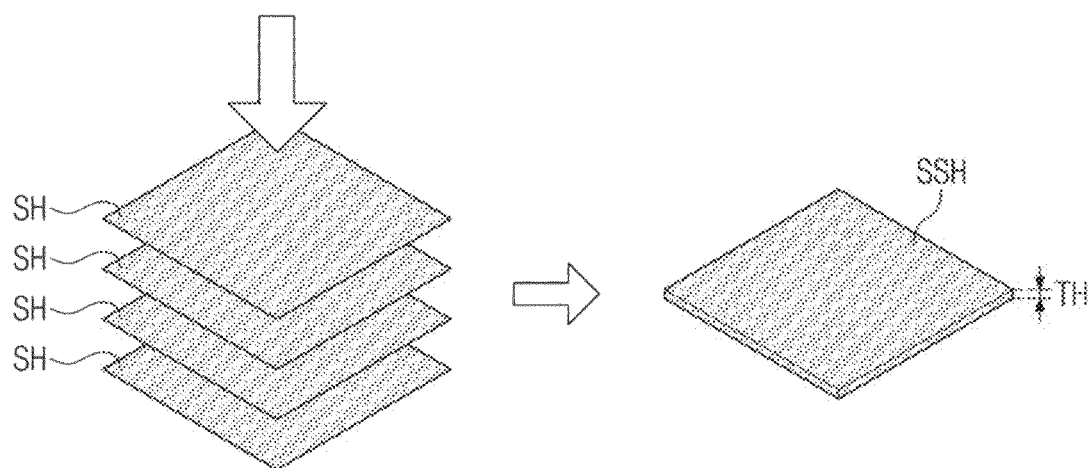
FIG. 5 is a schematic view for explaining a fourth step of FIG. 1.

FIG. 5 is a schematic view for explaining the fourth step of FIG. 1.

Referring to FIGS. 1 and 5, a plurality of sheets SH prepared in the third step S130 may be stacked. As a lamination process is performed on the stacked sheets SH, a laminate sheet SSH may be formed in the step S140. For example, the laminate sheet SSH may be configured by laminating three to five sheets SH. The lamination process may be performed at a temperature of about 60° C. with a pressure of about 10 MPa.

The laminate sheet SSH may be pressed. The pressing process may use a warm isostatic press (WIP). The pressing process may be performed at a temperature of about 70° C. with a pressure of about 30 MPa. Finally, the laminate sheet SSH may have a thickness TH of 0.3 mm to 4 mm.

Figure 6:
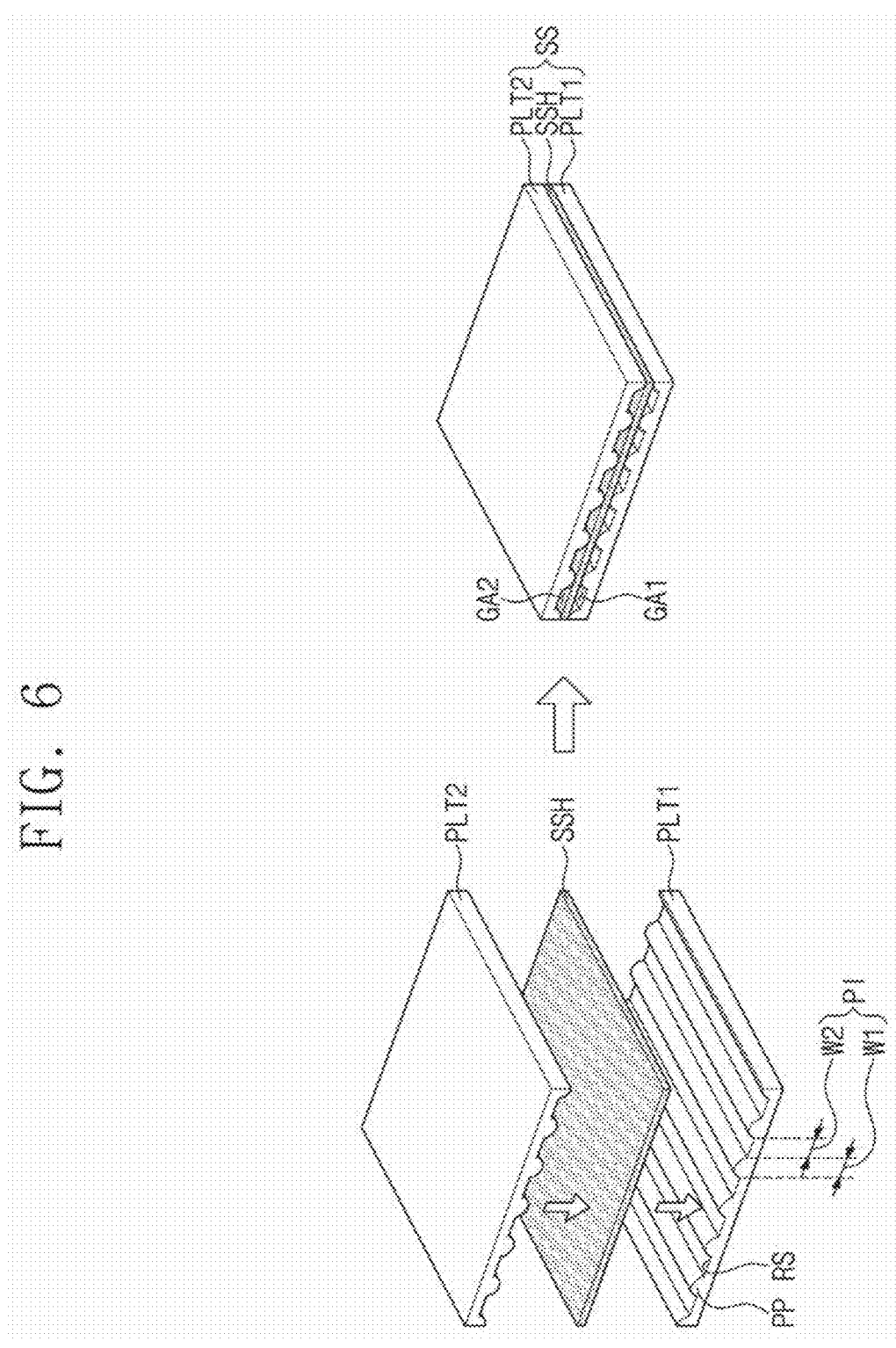
FIG. 6 is a schematic view for explaining a fifth step of FIG. 1.

FIG. 6 is a schematic view for explaining the fifth step of FIG. 1.

Referring to FIGS. 1 and 6, a stacked structure SS may be prepared. The stacked structure SS may include a lower plate PLT1, an upper plate PLT2, and the laminate sheet SSH disposed therebetween. The process of preparing the stacked structure SS may include sandwiching the laminate sheet SSH prepared in the fourth step S140 between the lower plate PLT1 and the upper plate PLT2. Although one laminate sheet SSH is disposed between the lower plate PLT1 and the upper plate PLT2 as an example in FIG. 6, the present invention is not limited thereto. For example, two or more laminate sheets SSH may be disposed between the lower plate PLT1 and the upper plate PLT2.

Before the stacked structure SS is prepared, a boron nitride BN may be evenly applied onto the laminate sheet SSH. Each of the lower plate PLT1 and the upper plate PLT2 may include the boron nitride. Each of the lower plate PLT1 and the upper plate PLT2 may have a density of 1.4 g/cm³ to 1.7 g/cm³. Each of the lower plate PLT1 and the upper plate PLT2 may have an area of 1.00 times to 1.02 times of an area of the laminate sheet SSH.

At least one of the lower plate PLT1 and the upper plate PLT2 may include a plurality of protrusions PP provided on one surface thereof. One surface of the laminate sheet SSH may contact the protrusions PP. The protrusions PP may extend in parallel to each other in one direction. A recess RS may be defined between the protrusions PP adjacent to each other. In other words, at least one of the lower plate PLT1 and the upper plate PLT2 may have a patterned surface. In another embodiment of the present invention, the protrusions PP may be omitted.

Each of the protrusions PP may have a first width W1. The recess RS may have a second width W2. The first width W1 and the second width W2 may be equal to or different from each other. The first width W1 may be 0 mm to 15 mm, preferably 0.1 mm to 15 mm, and more preferably 4 mm to 15 mm. The second width W2 may be 0 mm to 15 mm, preferably 0.1 mm to 15 mm, and more preferably 4 mm to 15 mm. The protrusions PP may be arranged with a predetermined pitch PI. The pitch PI of the protrusions PP may be a sum of the first width W1 and the second width W2.

The protrusion PP may have a rounded cross-sectional shape. For another example, the protrusion PP may have a polygonal (triangular or rectangular) cross-sectional shape.

The stacked structure SS may include a first gap GA1 between the lower plate PLT1 and the laminate sheet SSH and a second gap GA2 between the upper plate PLT2 and the laminate sheet SSH. The first gap GA1 may be defined by the adjacent protrusions PP and the recess RS defined therebetween of the lower plate PLT1. The second gap GA2 may be defined by the adjacent protrusions PP and the recess RS defined therebetween of the upper plate PLT2.

Figure 7:
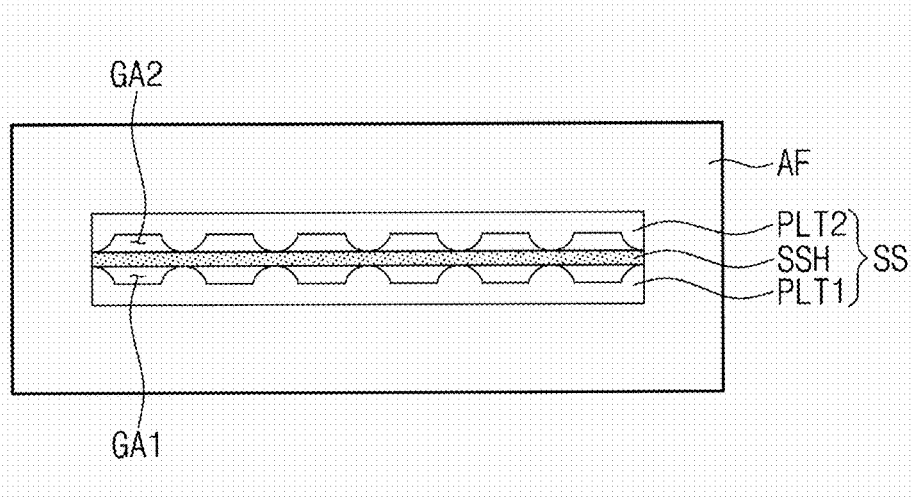
FIG. 7 is a schematic view for explaining a sixth step of FIG. 1.

FIG. 7 is a schematic view for explaining the sixth step of FIG. 1.

Referring to FIGS. 1 and 7, a degreasing process (e.g., binder burn out (B.B.O.)) may be performed on the stacked structure SS prepared in the fifth step S150 in the step S160. Thus, all of organic materials such as the binder, the dispersant, and the plasticizer in the laminate sheet SSH may be burnt and removed. The degassing process may be performed at a temperature of about 600° C. for 12 hours in an atmospheric furnace (AF). That is, the degassing process may be performed under the atmosphere (air).

As described above, the first gap GA1 may be secured on a bottom surface of the laminate sheet SSH, and the second gap GA1 may be secured on a top surface of the laminate sheet SSH. Although the laminate sheet SSH is sandwiched by the lower plate PLT1 and the upper plate PLT2, the degreasing process may be smoothly performed through the first gap GA1 and the second gap GA2. For example, a heated gas (i.e., air) may pass through the first gap GA1 and the second gap GA2. The heated gas may contact a bottom surface and a top surface of the laminate sheet SSH through the first gap GA1 and the second gap GA2.

Figure 8:
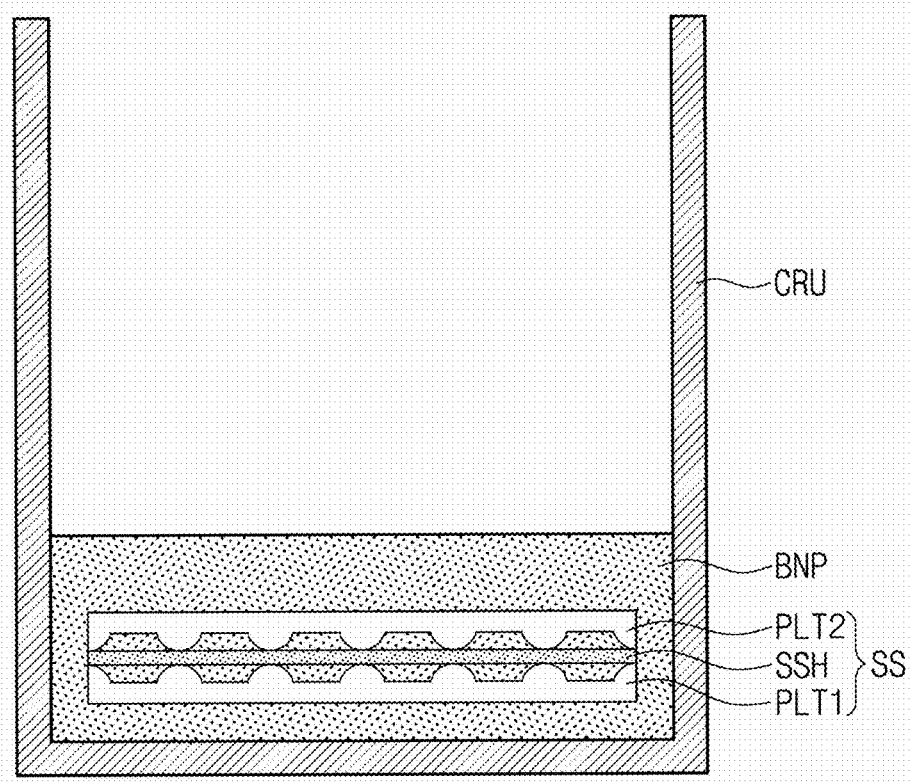
FIG. 8 is a schematic view for explaining a seventh step of FIG. 1.

FIG. 8 is a schematic view for explaining the seventh step of FIG. 1.

Referring to FIGS. 1 and 8, after the sixth step S160, the stacked structure SS may be provided in a crucible CRU. As bedding powder BNP is put into the crucible CRU, the stacked structure SS may be buried in the bedding powder BNP. The bedding powder BNP may include boron nitride powder, silicon nitride powder, or a mixture thereof. When the bedding powder BNP is the mixture of the boron nitride powder and the silicon nitride powder, the boron nitride powder and the silicon nitride powder may be mixed with a ratio of 1:1.

A sintering process may be performed on the stacked structure SS by heating the crucible CRU in the step S170. Accordingly, as the laminate sheet SSH is sintered a silicon nitride substrate may be formed. The sintering process may be performed at a temperature of about 1900° C. for 6 hours. The sintering process may be performed under a nitrogen atmosphere.

As described above, the first gap GA1 may be secured on the bottom surface of the laminate sheet SSH, and the second gap GA1 may be secured on the bottom surface of the laminate sheet SSH. Although the laminate sheet SSH is sandwiched by the lower plate PLT1 and the upper plate PLT2, the sintering process may be smoothly performed through the first gap GA1 and the second gap GA2.

The description of the present invention is intended to be illustrative, and those with ordinary skill in the technical field of the present invention will be understood that the present invention can be carried out in other specific forms without changing the technical idea or essential features. Therefore, the embodiments described above include examples in all respects and not restrictive, but it should be understood.

The invention claimed is:

1. A method for manufacturing a silicon nitride substrate, comprising: forming a slurry by mixing silicon nitride powder, a ceramic additive, and a solvent; molding the slurry to form sheets; forming a stacked structure by sandwiching at least one of the sheets between a lower plate and an upper plate; performing degreasing process on the stacked structure; and performing sintering process on the stacked structure, wherein: the lower plate comprises a plurality of first protrusions provided on an upper surface thereof, the upper plate comprises a plurality of second protrusions provided on a lower surface thereof, the first and second protrusions extend in parallel to each other in one direction, a first recess is defined between adjacent first protrusions, a second recess is defined between adjacent second protrusions, the stacked structure comprises a first gap defined by the adjacent first protrusions, the first recess, and a bottom surface of the sheet, and a second gap defined by the adjacent second protrusions, the second recess, and a top surface of the sheet, a heated gas is introduced which contacts the top surface and the bottom surface of the sheet through the first and second gap during the degreasing process, the sintering process comprises embedding the stacked structure, after the degreasing process, in bedding powder, the bedding powder comprises boron nitride powder and silicon nitride powder, and the bedding powder is in contact with the sheet through the first gap and the second gap.

2. The method of claim 1, wherein the ceramic additive comprises a yttrium oxide ($Y_2O_3$), a magnesium oxide (MgO), and a zirconium oxide ($ZrO_2$), a weight ratio of the yttrium oxide to the ceramic additive is 0.5 to 0.8, a weight ratio of the magnesium oxide to the ceramic additive is 0.1 to 0.4, and a weight ratio of the zirconium oxide to the ceramic additive is 0.1 to 0.3.

3. The method of claim 1, wherein the forming of the slurry comprises adding a binder and a plasticizer.

4. The method of claim 1, wherein the forming of the slurry comprises:

forming a first mixture by adding silicon nitride powder, the ceramic additive, and a dispersant to the solvent;

performing a first ball milling process on the first mixture;

forming a second mixture by adding a binder and a plasticizer to the first mixture on which the first ball milling process is completed; and performing a second ball milling process on the second mixture.

5. The method of claim 1, wherein the molding of the slurry comprises a tape casting process.

6. The method of claim 1, further comprising forming a laminate sheet by stacking the sheets and performing a lamination process thereon, before the forming of the stacked structure.

7. The method of claim 1, wherein each of the lower plate and the upper plate has a density of 1.4 $g/cm^3$ to 1.7 $g/cm^3$.

8. The method of claim 1, wherein each of the lower plate and the upper plate has an area of 1.00 times to 1.02 times of an area of the sheet.

9. The method of claim 1, wherein each of the first and second protrusions has a first width, each of the first and second recesses has a second width, the first width is 4 mm to 15 mm, and the second width is 4 mm to 15 mm.

10. The method of claim 1, wherein the first and second protrusions are arranged with a predetermined pitch.

\* \* \* \* \*